(12) United States Patent
Gulbahar et al.

(10) Patent No.: US 12,174,879 B2
(45) Date of Patent: Dec. 24, 2024

(54) GENERATING AND ASSIGNING METADATA

(71) Applicant: Transfermedia Production Services GMBH, Potsdam (DE)

(72) Inventors: Mark F. Gulbahar, Landshut (DE); Claudia Wolf, Nuthetal (DE); Peter Effenberg, Nuthetal (DE)

(73) Assignee: Transfermedia Production Services GMBH, Potsdam (DE)

( * ) Notice: Subject to any disclaimer, the term of this patent is extended or adjusted under 35 U.S.C. 154(b) by 0 days.

(21) Appl. No.: 18/680,948

(22) Filed: May 31, 2024

(65) Prior Publication Data

US 2024/0320261 A1 Sep. 26, 2024

Related U.S. Application Data

(63) Continuation of application No. PCT/IB2022/052389, filed on Mar. 16, 2022.

(51) Int. Cl.
*G06F 16/00* (2019.01)
*G06F 16/41* (2019.01)
*G06F 16/48* (2019.01)

(52) U.S. Cl.
CPC ............ *G06F 16/48* (2019.01); *G06F 16/41* (2019.01)

(58) Field of Classification Search
CPC .......... G06F 16/71; G06F 16/61; G06F 16/41; H04N 21/233; H04N 21/23418; H04N 21/26603; H04N 21/84
See application file for complete search history.

(56) References Cited

U.S. PATENT DOCUMENTS

| | | | |
|---|---|---|---|
| 2008/0040394 A1* | 2/2008 | McGrath | G11B 27/032 |
| 2016/0094600 A1* | 3/2016 | Besehanic | H04L 67/60 |
| | | | 709/219 |
| 2018/0173939 A1 | 6/2018 | Howe | |
| 2020/0371818 A1* | 11/2020 | Banne | G06F 40/20 |
| 2021/0350141 A1* | 11/2021 | Janakiraman | G06V 20/41 |
| 2023/0037470 A1* | 2/2023 | Kalish | H04N 5/2723 |

OTHER PUBLICATIONS

International Search Report and Written Opinion dated Oct. 24, 2022, issued in PCT Application No. PCT/IB2022/052389, filed Mar. 16, 2022.

* cited by examiner

*Primary Examiner* — Cheryl Lewis
(74) *Attorney, Agent, or Firm* — Workman Nydegger

(57) ABSTRACT

Generating and assigning metadata relating to action objects which arise in audio and/or visual media contents. The action objects are visual and/or audible objects or elements which can be perceived by a viewer and/or listener in audio and/or visual media contents and which originate from different production steps of the audio and/or visual media contents.

15 Claims, 2 Drawing Sheets

GENERATING AND ASSIGNING METADATA

CROSS-REFERENCE TO RELATED APPLICATIONS

This application is a continuation of PCT Application No. PCT/IB2022/052389, filed Mar. 16, 2022, which is incorporated herein in its entirety by specific reference.

BACKGROUND OF THE INVENTION

1. The Field of the Invention

The present invention relates to a method, a device, a computer program and a computer program product for generating and assigning metadata of action objects of an audio and/or visual media content.

2. The Relevant Technology

It is known that metadata is used as additional information to describe audio and/or visual media content and to specify technical and descriptive properties of an audio and/or visual media content. Examples of metadata include author, creation date, recording location, camera information, upload date, image resolution, refresh rate, aperture, focal length, artist name, music style and sample rate.

SUMMARY OF THE INVENTION

The invention is based on the object of generating and assigning metadata about action objects that appear in an audio and/or visual media content. The action objects are visual and/or audible objects or elements that can be perceived by a viewer and/or listener in an audio and/or visual media content and are not physical characteristics of the digital data of a video file or an audio file. Furthermore, the invention is based on the object of making the metadata of action objects from the various production steps of the audio and/or visual media content precisely identifiable and traceable in terms of concepts and/or time.

The present invention is described below according to the claims, listed embodiments and figures.

According to a first aspect of the present invention, a method is provided for processing and generating metadata of action objects of an audio and/or visual media content, the method comprising the following steps:

processing data from at least two production steps of the audio and/or visual media content, whereby the data is digitized information about the respective production step.

A further step involves identifying data elements from the data with reference to the action objects used in the audio and/or visual media content to create or produce the audio and/or visual media content. According to the invention, the objects of action can be persons, objects, services, backgrounds, locations or generally self-contained elements of image and/or sound that are used in the respective sequences of the audio and/or visual media content based on the plot of the audio and/or visual media content. Thus, in this step, data elements related to the action objects in the audio and/or visual media content are identified.

In a further step, data elements from at least two production steps that belong to a single action object are assigned. Data elements from at least two different production steps are processed in such a way that they are precisely assigned to the corresponding and single action object. Preferably, the assignment is carried out in such a way that different designations and/or specifications from the at least two different production steps for the same action object are identified algorithm-based and the data elements are assigned to one another in order to establish, that they are data elements for the same action object. Preferably, the assignment of data elements to the same action object is based on the ontology and/or the data model, so that similar and/or synonymous designations are identified in the different production steps and assigned to the relevant action object. Further preferably, the assignment of data elements to the same action object is based on a comparison of parameters and/or parameter values that specify a particular action object and can be assigned to the same action object, so that it can be concluded that it is the same action object.

Furthermore, a uniform designation is defined for the data elements from the at least two production steps that belong to the single action object and a first time value of the time of occurrence of the single action object is assigned. According to the invention, the uniform designation for the data elements is introduced so that the action object is identified with the uniform designation across different production steps and additionally receives the time value at which the action object appeared in the audio and/or visual media content. Preferably, the first time value may be a plurality of time values and/or a plurality of time windows.

Next, a temporal offset of the first time value of the occurrence time of the action object is identified. In this case, the time offset is preferably identified by comparing the first time value with another time value of the time of occurrence in another production step and/or a master version or a final version of the audio and/or visual media content. Subsequently, a second time value of the occurrence time of the action object in a master version of the audio and/or visual media content is calculated, whereby the second time value is based on the identified offset. Further according to the invention, metadata consisting of the uniform designation and the calculated second time value are generated in the master version for the only action object.

Preferably according to the present invention, an object of action is an object, a person or a service.

Furthermore, according to a further aspect of the present invention, segment information is additionally processed and the single action object is assigned to a specific segment from the audio and/or visual media content and the generated metadata is additionally provided with the segment information.

Furthermore, according to a further aspect of the present invention, a link is established between the single action object and at least one further action object or further single action object and the generated metadata are additionally provided with link information between the single action object or the further single action object and the further single action object.

This produces metadata that contains linking information between the respective action objects, so that the action objects are linked to each other. Preferably, action objects that represent a product and/or service are linked to an action object as a person.

Further according to another aspect of the present invention, the data element of an action object comprises at least one predefined parameter, wherein the predefined parameter comprises at least one parameter value to specify the action object.

Further according to another aspect of the present invention, the occurrence time is a perception time or perception time window of the action object in an audio and/or video content by a viewer and/or listener.

Furthermore, according to a further aspect of the present invention, the assignment is carried out by a plausibility check of existing and/or missing parameters and/or parameter values and/or ontology-based and/or based on a data model and/or depending on a comparison between the parameters from at least two different production steps for the same action object.

Furthermore, according to a further aspect of the present invention, information about the presence of action objects in a further data set, in particular in an action object data set of a third-party provider of products and/or services and/or a sales platform and/or a knowledge database, is used, with a step for generating a comparison list based on the action objects of the audio and/or visual media content and the existing action objects in the further data set.

In this case, a comparison is made between the data set created according to the invention for the action objects of the audio and/or visual media content with the further data set with products and/or services in order to identify matches and/or similarities and/or differences, so that the aforementioned comparison list can then be created.

Preferably, the aforementioned Comparison based on a predefined scale is used to calculate a match rate.

Preferably according to the invention, the parameter is a placeholder for color, size, manufacturer information, material, purchase address, time information, ingredient, design name, purpose of use, identification number, price, description of action, location, duration of visibility, statistical information, time of performance, duration of performance, number of performances, size of performance or action object specification.

According to a further aspect of the present invention, a computer program product is proposed which can be loaded into the memory of an electronic computer and which comprises instructions which, when executed by the electronic computer, cause the electronic computer to carry out steps of the methods according to any one of the preceding method claims. The electronic computer is preferably a personal computer, a smartphone, a tablet PC, a server or a notebook. Further preferably according to the invention and in combination with one of the described embodiments, the data set of a third-party provider is data of a video platform and/or a digital online shop for products and/or services.

Further preferably according to the invention and in combination with one of the described embodiments, time values for the action objects or timecodes of action objects are tied to the master version or master files of the audio and/or visual media content.

Further preferably according to the invention and in combination with one of the described embodiments, the data set created according to the invention is assigned or mapped according to a predefined standard.

Further preferably according to the invention and in combination with one of the described embodiments, the production step is a script, a pre-production, a costume design, a production design, a script continuity, a footage, a film edit, a visual effect, a color correction, a sound mix, a master.

Further preferably according to the invention, a device for processing and generating metadata of action objects of an audio and/or visual media content is proposed, wherein the device comprises: a processing unit with at least one input for receiving and processing data from at least two production steps of the audio and/or visual media content, wherein the processing unit is configured to identify data elements from the data with reference to the action objects, wherein the device comprises an assignment unit configured to assign the data elements from at least two production steps that belong to a single action object to one another, wherein the processing unit is further configured to determine a uniform designation for the data elements from the at least two production steps that belong to the single action object, wherein the device comprises an assignment unit configured to assign a first time value of the time of occurrence of the single action object, wherein the processing unit is further configured to identify a time offset of the first time value of the time of occurrence of the action object, wherein the device further comprises a calculation unit which is configured to calculate a second time value of the time of occurrence of the action object in a master version of the audio and/or visual media content, wherein the second time value is based on the identified offset, wherein the processing unit is further configured to generate metadata consisting of the uniform designation and the calculated second time value in the master version for the single action object.

It is further proposed according to the invention that the processing unit is further configured to process segment information and to assign the single action object to a specific segment from the audio and/or visual media content and to additionally provide the generated metadata with the segment information.

It is further proposed according to the invention that the device further comprises a linking unit which is configured to additionally establish a link between the single action object and at least one further single action object and to additionally provide the generated metadata with linking information between the single action object and the further single action object.

It is further proposed according to the invention that the processing unit is further configured to process information about an action object as an object, a person, a service, a real body, an animated body or a real-animated combination of a body and/or that the processing unit is configured to process a data element, wherein the data element of an action object has at least one predefined parameter and wherein the predefined parameter has at least one parameter value in order to specify the action object.

It is further proposed according to the invention that the processing unit is set up to process the time of occurrence as a perception time or perception time window of the action object in the audio and/or video content and/or that the processing unit is set up to receive and process additional data in order to carry out the assignment on an ontology-based and/or data model-based basis.

It is further proposed according to the invention that the processing unit is set up to assign by means of a plausibility check of existing and/or missing parameters and/or parameter values between at least two production steps and/or that the processing unit is configured to receive and use information about the presence of action objects in a further data set, in particular in an action object data set of a third-party provider of products and/or services, a sales platform or a knowledge database, and wherein the processing unit is further configured to generate a comparison list based on the action objects of the audio and/or visual media content and the existing action objects in the further data set.

It is further proposed according to the invention that the processing unit is set up to process the parameter as a placeholder for color, size, manufacturer information, material, purchase address, time information, ingredient, design name, reason for use, identification number, price, action description, location information, duration of visibility, statistical information, time of appearance, duration of appearance, number of appearances, size of appearance or action object specification.

Furthermore, according to the invention, a computer program is proposed, wherein the computer program comprises instructions which, when the program is executed by a device, cause the device to operate according to one of the devices described here according to the invention.

Furthermore, according to the invention, a computer program product is proposed which can be loaded into the memory of an electronic computer and which has instructions which, when executed by the electronic computer, cause the electronic computer to carry out the steps according to one of the methods described here.

BRIEF DESCRIPTION OF THE DRAWINGS

The invention is described in more detail below with reference to figures.

DETAILED DESCRIPTION OF THE PREFERRED EMBODIMENTS

Figure 1:
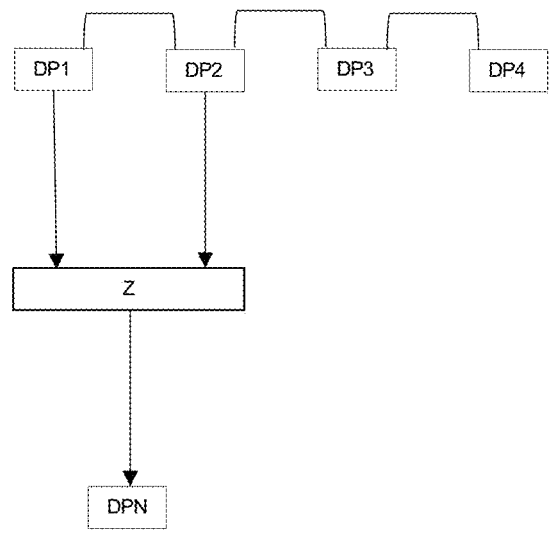
FIG. 1 shows metadata from different production steps and the generation of new metadata according to one aspect of the present invention.

FIG. 1 shows metadata of action objects of an audio and/or visual media content from different production steps DP1, DP2, DP3 and DP4. According to the invention, the metadata from the first production step DP1 and the second production step DP2 are identified.

In step Z, the metadata from DP1 and DP2 that belong to a single action object and a first time value of the time of occurrence of the respective action objects from the metadata DP1 and DP2 is assigned, so that new metadata DPN is then available that has assigned the action objects from DP1 and DP2 to each other and also shows the respective times of occurrence of the action objects. Thus, according to the invention, the DPN metadata are generated, which clearly indicate the action objects with the corresponding time of occurrence.

Figure 2:
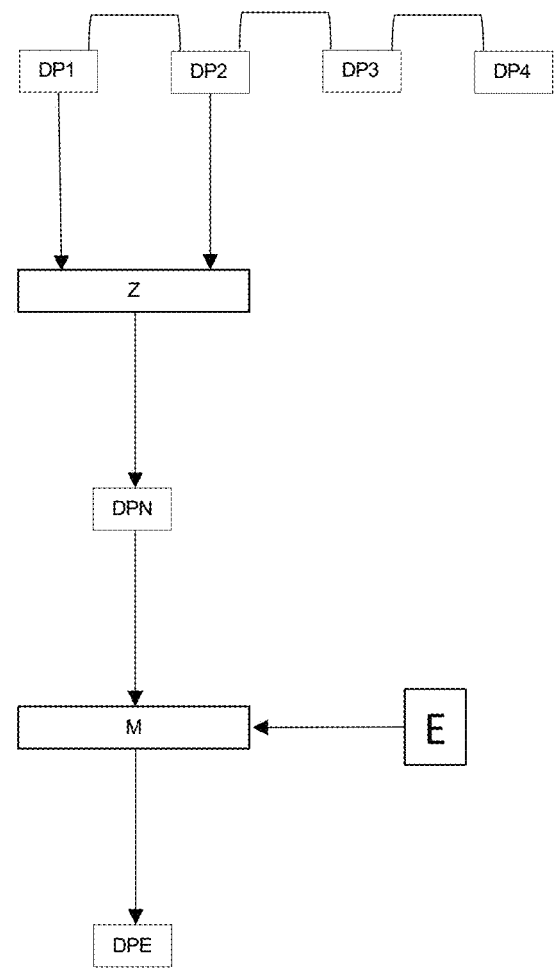
FIG. 2 shows a comparison of the metadata generated according to the invention with another data set from a third party provider.

FIG. 2 further shows, based on the description of FIG. 1, a further processing of the newly generated metadata DPN using another data set E from a third-party provider and additionally carries out step M in order to perform a comparison between the metadata DPN and E.

In step M, the action objects from the production steps DP1 and DP2, which are standardized in the metadata DPN, are compared with the additional data set E, and the action objects that find a correspondence in E are generated as a new data set DPE or as a comparison list.

Thus, according to the invention, the comparison list DPE is used to determine the relevance of the action objects from DP1 and DP2 using the metadata DPN for the data set of the third-party provider E.

Further alternatively based on FIG. 2, it can be described that the third-party data set E represents a specification to represent the metadata DPN depending on this specification defined by the data set E. Consequently, according to the aforementioned alternative, the comparison list DPE can contain data on action objects that are defined as relevant by the data set E and are thus important for the third-party provider. Alternatively, the data set E can be used as a predefined or standardized specification for representation or formatting of the DPN metadata can be used so that the DPN metadata is converted into a format compliant with the E standard depending on the specified E standard and then corresponds to the respective desired representation of a third-party provider as DPE.

Alternatively, based on FIG. 2, it can be described that the data set E is a distribution-related specification, which, for example, depends on the platform to be used for example television, internet platform, mobile distribution, the metadata DPN is adapted depending on the data set E and then available as a platform-compliant data set DPE.

What is claimed is:

1. A method for processing and generating metadata of action objects of an audio and/or visual media content, said method comprising the following steps:
 processing data from at least two production steps of said audio and/or visual media content by a processor;
 identifying data elements from said data with reference to said action objects by said processor;
 assigning data elements from said at least two production steps that belong to a single action object by means of an assigning unit;
 establishing a uniform designation for said data elements from said at least two production steps that belong to said single action object by said processor;
 allocating a first time value of the occurrence time of said single action object;
 Identifying a temporal offset of said first time value of said occurrence time of said action object by said processor;
 calculating by means of a calculation unit a second time value of said occurrence time of said action object in a master version of said audio and/or visual media content, wherein the second time value is based on said identified offset;
 generating by said processor metadata consisting of said uniform designation and said calculated second time value in said master version for said single action object.

2. The method according to claim 1, wherein said method additionally processes segment information by said processor and assigns said single action object to a specific segment from said audio and/or visual media content and additionally provides said generated metadata with said segment information.

3. The method according to claim 1, wherein said method additionally establishes a link between said single action object and at least one further action object or further single action object by means of a linking unit and additionally provides said generated metadata with link information between said further action object or said further single action object.

4. The method according to claim 1, wherein an action object is an object, a person, a service, a real body, an animated body or a real-animated combination of a body.

5. The method according to claim 1, wherein said data element of an action object has at least one predefined parameter and wherein the predefined parameter has at least one parameter value to specify said action object.

6. The method according to claim 1, wherein said occurrence time is a perception time or perception time window of the action object in said audio and/or video content.

7. The method according to claim 1, wherein said assignment is carried out ontology-based and/or data model-based.

8. The method according to claim 1, wherein said assignment is carried out by a plausibility check of existing and/or missing parameters and/or parameter values between at least two production steps.

9. The method according to claim 1, wherein said method further comprises:
using information about the existence of action objects in another data set, in particular in an action object data set of a third-party provider of products and/or services, a sales platform or a knowledge database,
generating a comparison list based on said action objects of said audio and/or visual media content and said existing action objects in said further data set.

10. The method according to claim 1, wherein said parameter is a placeholder for color, size, manufacturer information, material, purchase address, time information, ingredient, design name, reason for use, identification number, price, action description, location information, duration of visibility, statistical information, time of appearance, duration of appearance, number of appearances, size of appearance or action object specification.

11. A computer program product which can be loaded into the memory of an electronic computer and which comprises instructions which, when executed by the electronic computer, cause the electronic computer to carry out the steps of the method according to claim 1.

12. An apparatus for processing and generating metadata of action objects of an audio and/or visual media content, the apparatus comprising:
a processor with at least one input for receiving and processing data from at least two production steps of the audio and/or visual media content, wherein the processor is configured to identify data elements from said data with reference to said action objects, wherein the device has an assignment unit configured to assign the data elements from at least two production steps that belong to a single action object to one another, wherein the processor is further configured to determine a uniform designation for said data elements from said at least two production steps that belong to said single action object, wherein the device has an assignment unit configured to assign a first time value of said time of occurrence of said single action object, wherein said processor is further configured to identify a time offset of the first time value of the time of occurrence of said action object, wherein said apparatus further comprises a calculation unit configured to calculate a second time value of said time of occurrence of said action object in a master version of said audio and/or visual media content, wherein said second time value is based on said identified offset, wherein said processor is further configured to generate metadata consisting of said uniform designation and said calculated second time value in said master version for said single action object.

13. The apparatus according to claim 12, wherein said processor is further configured to process segment information and to assign said single action object to a specific segment from said audio and/or visual media content and to additionally provide said generated metadata with said segment information.

14. The apparatus according to claim 12, wherein said apparatus further comprises a linking unit which is configured to additionally establish a link between said single action object and at least one further single action object and to additionally provide said generated metadata with linking information between said single action object and said further single action object.

15. The apparatus according to claim 12, wherein said processor is further configured to process information about an action object as an object, a person, a service, a real body, an animated body or a real-animated combination of a body and/or the processor is configured to process a data element, wherein the data element of an action object has at least one predefined parameter and wherein the predefined parameter has at least one parameter value to specify the action object and/or that the processor is configured to process said time of occurrence as a perception time or perception time window of the action object in the audio and/or video content and/or that the processor is configured to receive and process additional data in order to carry out said assignment on an ontology-based and/or data model-based basis and/or that the processor is configured to carry out said assignment by means of a plausibility check of existing and/or missing parameters and/or parameter values between at least two production steps and/or that the processor is configured to receive and use information about the presence of action objects in a further data set, in particular in an action object data set of a third-party provider of products and/or services, a sales platform or a knowledge database, and wherein the processor is further configured to generate a comparison list based on the action objects of said audio and/or visual media content and the existing action objects in said further data set and/or that the processor is configured to process the parameter as a placeholder for color, size, manufacturer information, material, purchase address, time information, ingredient, design name, reason for use, identification number, price, action description, location information, duration of visibility, statistical information, time of appearance, duration of appearance, number of appearances, size of appearance or action object specification.

* * * * *